(12) United States Patent
Phillips et al.

(10) Patent No.: US 8,773,115 B2
(45) Date of Patent: Jul. 8, 2014

(54) BLADE TIP CLEARANCE MEASUREMENT SENSOR FOR GAS TURBINE ENGINES

(75) Inventors: Richard W. Phillips, Eagan, MN (US);
Chad P. Stay, Brooklyn Park, MN (US);
Martin Harrison, Northants (GB);
Peter Wherritt, Oxford (GB)

(73) Assignees: Rosemount Aerospace Inc., Burnsville, MN (US); Oxford RF Sensors Limited, Oxford (GB)

(*) Notice: Subject to any disclaimer, the term of this patent is extended or adjusted under 35 U.S.C. 154(b) by 181 days.

(21) Appl. No.: 13/199,375

(22) Filed: Aug. 26, 2011

(65) Prior Publication Data

US 2012/0032689 A1 Feb. 9, 2012

Related U.S. Application Data

(63) Continuation of application No. 13/196,260, filed on Aug. 2, 2011, which is a continuation of application No. 12/286,262, filed on Sep. 29, 2008, now abandoned.

(51) Int. Cl.
*G01B 7/14* (2006.01)
(52) U.S. Cl.
USPC ................................. 324/207.16; 324/207.15
(58) Field of Classification Search
USPC ........................................ 324/207.15, 207.16
See application file for complete search history.

(56) References Cited

U.S. PATENT DOCUMENTS

| 4,045,729 | A | | 8/1977 | Loh |
| 4,267,508 | A | | 5/1981 | Ando |
| 4,311,982 | A | | 1/1982 | Trietley, Jr. |
| 4,330,234 | A | | 5/1982 | Colley |
| 4,563,643 | A | | 1/1986 | Leschek et al. |
| 4,754,642 | A | * | 7/1988 | Miyairi et al. ............. 73/152.35 |
| 5,104,287 | A | | 4/1992 | Ciokajlo |
| 5,330,320 | A | | 7/1994 | Mansson |
| 5,572,039 | A | | 11/1996 | Sweeney et al. |
| 5,739,524 | A | | 4/1998 | Fally |
| 5,791,308 | A | * | 8/1998 | Carter et al. ............. 123/145 A |
| 6,678,060 | B2 | | 1/2004 | Heyworth |
| 6,984,994 | B2 | | 1/2006 | Gregg |

(Continued)

FOREIGN PATENT DOCUMENTS

| CA | 2353759 A1 | 1/2003 |
| GB | 765546 A | 1/1957 |

(Continued)

OTHER PUBLICATIONS

Leschek's Partial Reproduced Figure 1 (US Patent No. 4,563,643), Jan. 7, 1986.*

(Continued)

*Primary Examiner* — Bot Ledynh
(74) *Attorney, Agent, or Firm* — Edwards Wildman Palmer LLP; Scott D. Wofsy; Joshua L. Jones

(57) ABSTRACT

An electromagnetic field sensor assembly for blade tip clearance measurement in a gas turbine engine is disclosed that includes a ceramic sensor body, a multi-layered wire coil wound about a distal end portion of the sensor body for producing an electromagnetic field, a ceramic well enclosing the sensor body and the coil, and a metallic housing surrounding the well and having an open distal end.

14 Claims, 4 Drawing Sheets

(56) References Cited

U.S. PATENT DOCUMENTS

| | | |
|---|---|---|
| 7,026,908 B2 | 4/2006 | Habboosh |
| 7,259,552 B2 | 8/2007 | Twerdochlib |
| 7,400,418 B2 | 7/2008 | Haffner et al. |
| 7,407,369 B2 | 8/2008 | Schwarz et al. |
| 8,202,081 B2 * | 6/2012 | Neter et al. .................. 425/547 |
| 2002/0010090 A1 | 1/2002 | Ono |
| 2004/0075427 A1 * | 4/2004 | Aruga et al. ............. 324/207.17 |
| 2006/0006872 A1 * | 1/2006 | Nelson .......................... 324/327 |

FOREIGN PATENT DOCUMENTS

| | | |
|---|---|---|
| JP | 60163303 | 10/1985 |
| JP | 3015146 | 8/1995 |
| JP | 09-185815 | 7/1997 |
| JP | 10300410 | 11/1998 |
| JP | 2002-340692 | 11/2002 |

OTHER PUBLICATIONS

European Search Report dated Nov. 4, 2009 for EP09010615.

Japanese Office Action dated Apr. 16, 2013 issued in JP-TOKUGAN-2009-221838.

* cited by examiner

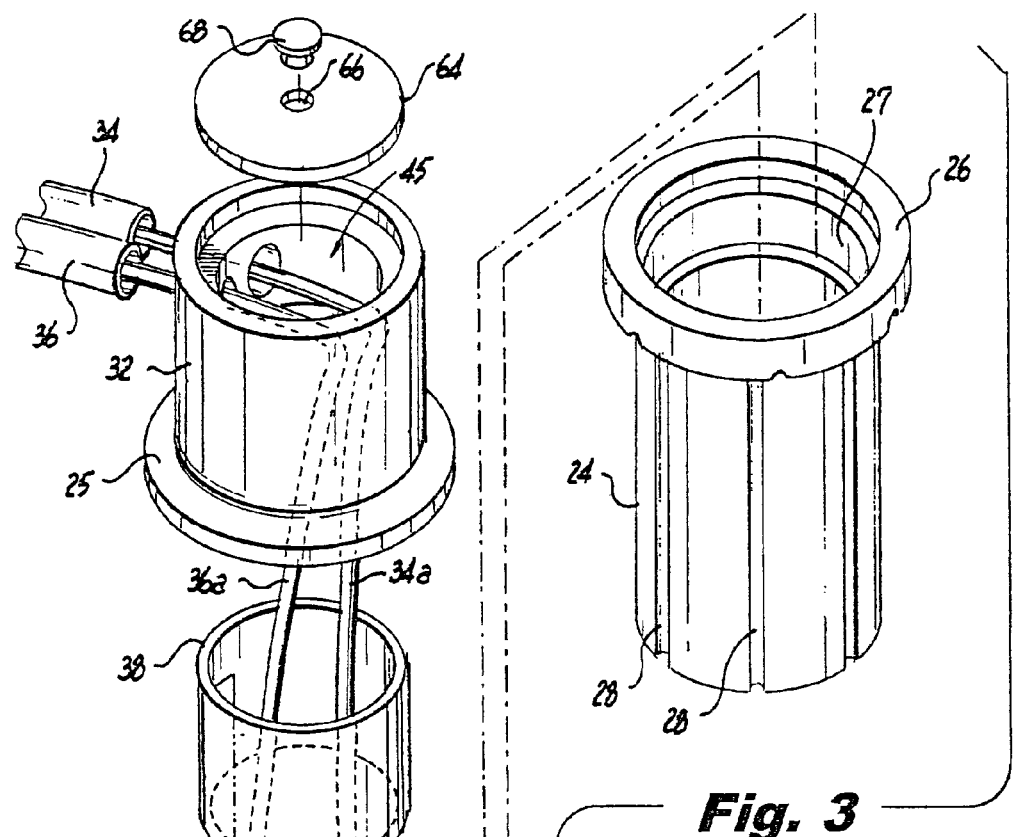
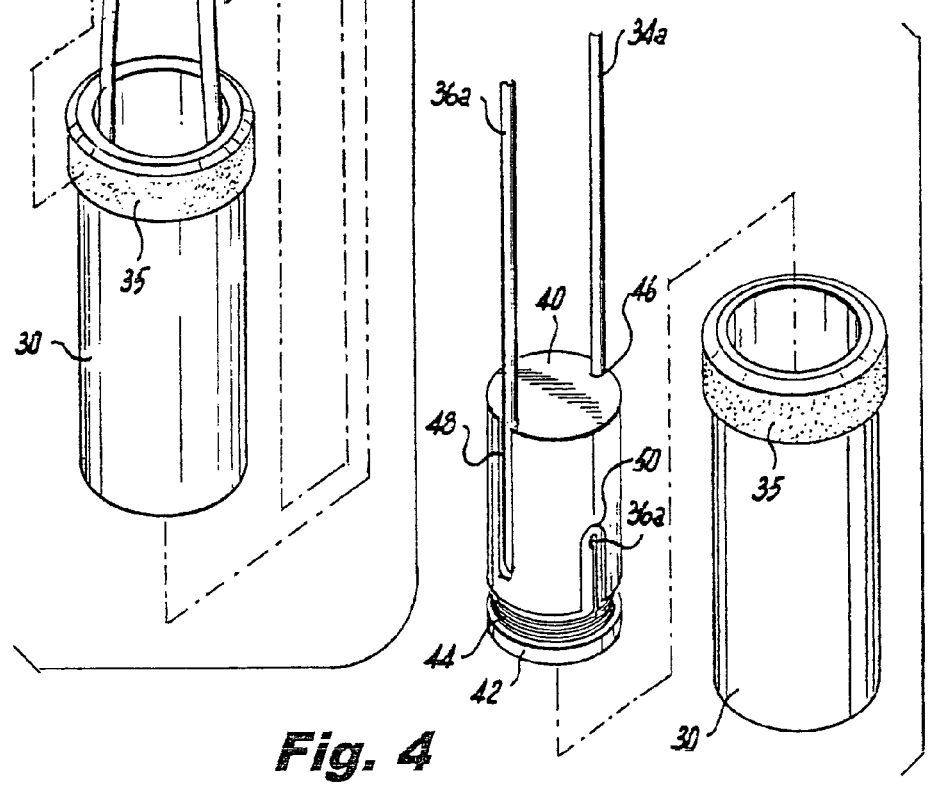

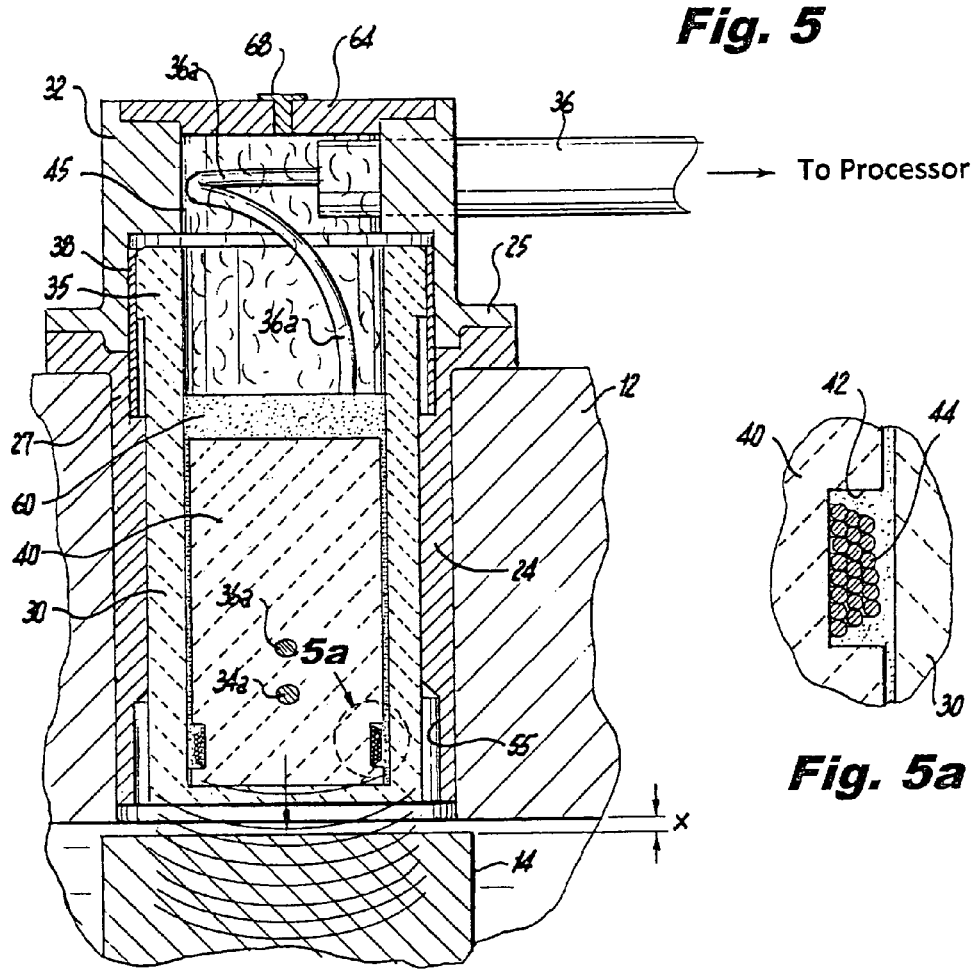
*Fig. 5*
→ To Processor
*Fig. 5a*
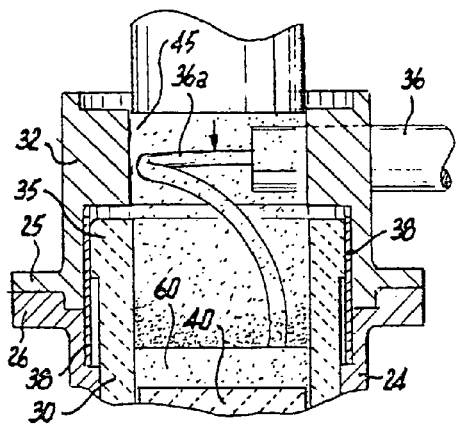
*Fig. 6*
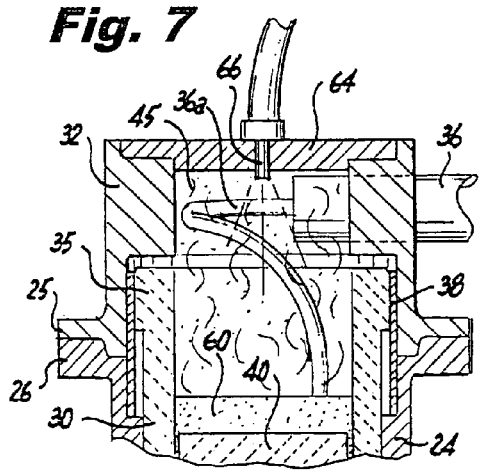
*Fig. 7*

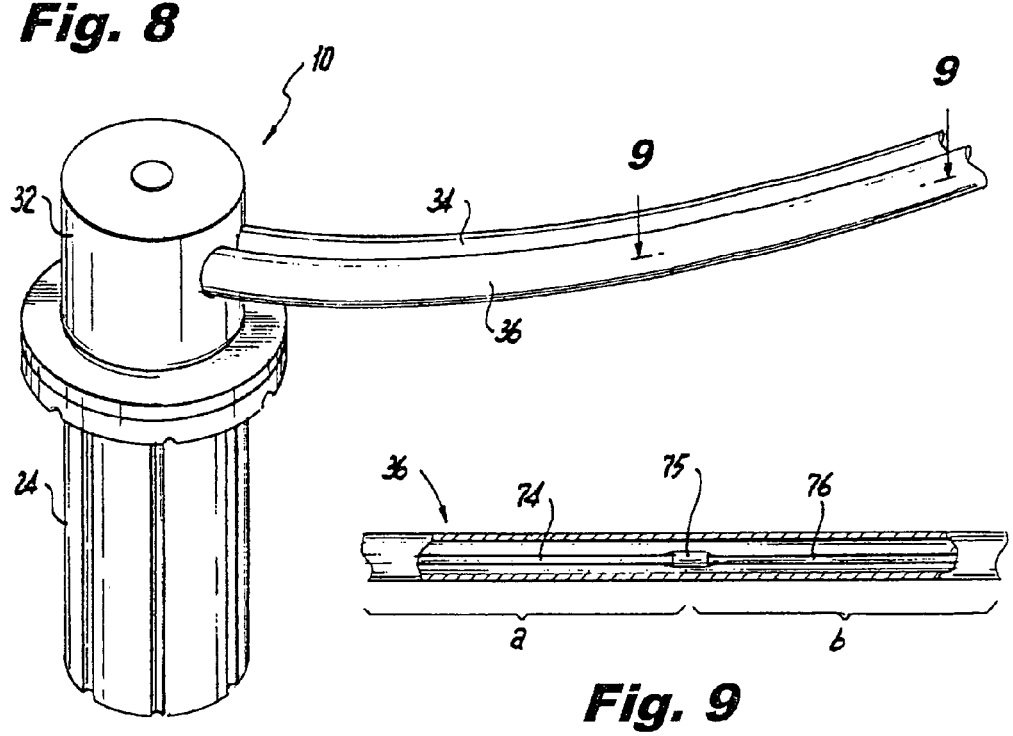
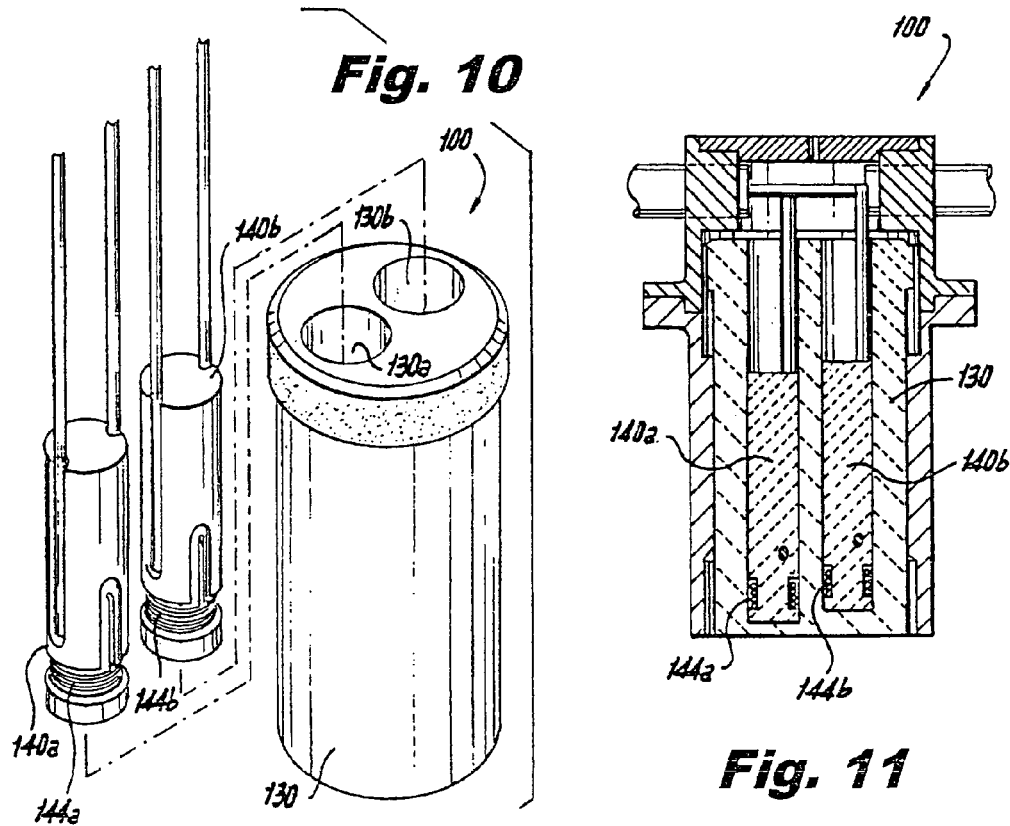

BLADE TIP CLEARANCE MEASUREMENT SENSOR FOR GAS TURBINE ENGINES

CROSS-REFERENCE TO RELATED APPLICATIONS

The subject application is a continuation of U.S. application Ser. No. 13/196,260 filed on Aug. 2, 2011, which is a continuation of U.S. application Ser. No. 12/286,262 filed on Sep. 29, 2008, now abandoned.

BACKGROUND OF THE INVENTION

1. Field of the Invention

The subject invention is directed to electromagnetic field sensors, and more particularly, to a blade tip measurement system that uses a marginal oscillator circuit and a heat resistant sensor assembly to generate an RF electromagnetic field in a casing of a gas turbine engine, whereby perturbation of the field by an array of rotating blade tips represents a change in susceptibility that impacts the circuit to indicate a clearance measurement between the blade tips and the engine casing.

2. Description of Related Art

In an axial flow gas turbine engine, it is desirable to minimize the clearance between the blade tips of a turbine rotor and the engine casing that surrounds the rotor.

This is because excessive clearances between the blade tips and the engine casing reduce engine efficiency, and contact between the blade tips and engine casing causes damage to the engine.

The prior art includes a variety of solutions for maintaining blade tip clearance in a gas turbine engine. One such solution is a mechanical system for adjusting the radial position of the casing surrounding the rotor blades to improve engine efficiency, as disclosed in U.S. Pat. No. 5,104,287. Another solution is a mechanical system for moving the rotor disc relative to the engine casing, as disclosed for example in U.S. Pat. No. 5,330,320. An active clearance control systems that includes an actuator for moving a rotor blade assembly relative to the engine casing to maintain the minimum design clearance between the blade tips and the engine casing is disclosed in U.S. Pat. No. 7,407,369, the disclosure of which is incorporated by reference in its entirety.

These clearance control systems require a mechanism for monitoring blade tip clearance with a high degree of accuracy, under the severe environmental conditions that exist within the turbine gas path. These severe conditions include high blade tip speeds, vibration modes, high pressure fluctuations and the exceedingly high temperatures of the turbine gases, which can be as hot as 1400° C.

An example of a prior art blade tip clearance monitoring system is disclosed in U.S. Pat. No. 6,678,060 to Hayworth, which employs a group of photo-cells that monitor the position of the blade tips by detecting changes in the shape of a detected image. Another example of a prior art blade tip monitoring system is disclosed in U.S. Pat. No. 5,739,524 to Fally, which employs an optical probe that senses the distance of an object by measuring reflected radiation.

While optical measuring devices known in the art are effective for measuring blade tip clearance, they are often susceptible to the severe thermal environment of a gas turbine engine, leading to difficulties in calibration, which can result in inaccurate measurements over time.

SUMMARY OF THE INVENTION

The subject invention is directed to an electromagnetic field sensor assembly, and more particularly, to a sensor assembly and system for monitoring or otherwise measuring blade tip clearance in a gas turbine engine. The sensor assembly is particularly well adapted for the high temperature operating environment that exists within a gas turbine engine. In this regard, the sensor assembly includes a ceramic sensor body, a wire coil wound about a distal end portion of the sensor body for producing an electromagnetic field, a ceramic well enclosing the sensor body and the coil, and a metallic outer housing surrounding a periphery of the ceramic well and having an open distal end. The outer housing of the sensor assembly is configured to be mounted in the engine casing adjacent an array of blade tips.

The sensor body is preferably formed from aluminum oxide or a similar refractory material. The wire coil wrapped about the distal end portion of the sensor body is preferably formed from wire comprised of a platinum group metal or an alloy thereof. For example, the wire may be formed from Pt-10Rh, which is a platinum alloy that includes 10% Rhodium. Alternatively, the wire may be formed from an oxide dispersion strengthened platinum group metal or alloy thereof. Preferably, the coil is formed from ceramic coated wire, and more preferably, the wire forming the coil is coated with aluminum oxide. The coil is preferably formed in plural layers, with each layer having a plurality of turns. Preferably, the distal end portion of the sensor body has an annular recess for accommodating the multi-layered coil, and the coil is anchored to the sensor body within the annular recess by cement.

The ceramic well is a sealed enclosure and is preferably formed from aluminum oxide, and it has a metallized section to facilitate attachment to the metallic outer housing. Preferably, the metallic outer housing is formed from a heat resistant metal that is compatible with the material from which the adjacent engine casing is constructed, such as, for example, Ni—Cr alloy 600. It is envisioned that the outer housing may include a plurality of longitudinally extending cooling channels communicating with the exterior of the engine casing.

Preferably, a transition member is provided for joining the ceramic well to the metal housing, while serving to buffer thermal stress in the sensor assembly. A cable adapter is also joined to the metallic housing adjacent the proximal end portion thereof, and a pair of coaxial cable assemblies are joined to the cable adapter for connection with the coil of the sensor body. More particularly, cable lead wires join the center conductors of the coaxial cables to opposed ends of the coil. In an embodiment of the subject invention, the center conductor of each coaxial cable is formed from two different materials including a first temperature resistant material located adjacent to the sensor assembly and a second material located remote from the sensor assembly in a region of lower temperature.

In another embodiment of the subject invention, the sensor assembly includes two sensor bodies each having a multi-layered coil associated with the distal end portion thereof, wherein each coil is driven by or otherwise forms part of a separate marginal oscillator circuit. In such an instance, the distal end portions of the two sensor bodies are axially off-set from one another to facilitate system level self-calibration.

The subject invention is also directed to a blade tip clearance measurement system for a gas turbine engine that includes an electromagnetic field sensor assembly positioned in the casing of a gas turbine engine adjacent an array of blade tips, a marginal oscillator circuit operatively connected to the sensor assembly for generating an electromagnetic field in relation to the blade tips, and means for processing an output signal received from the sensor assembly in response to perturbation of the electromagnetic field by passage of the blade tips therethrough, wherein the output signal is indicative of the position of the blade tips relative to the engine casing. In essence, the coil wire that is positioned within the temperature resistant sensor assembly is a remote extension of the marginal oscillator circuit.

The subject invention is further directed to a method for measuring blade tip clearance in a gas turbine engine that includes the steps of generating an electromagnetic field between the engine casing and an array of rotating blade tips, sensing changes in the electromagnetic field as the rotating blade tips pass therethrough, and determining the position of the blade tips relative to the engine casing based upon changes in the electromagnetic field.

These and other features of the blade tip clearance measurement system, sensor assembly and measurement method of the subject invention will become more readily apparent to those having ordinary skill in the art from the following detailed description of the invention taken in conjunction with the several drawings described below.

BRIEF DESCRIPTION OF THE DRAWINGS

So that those skilled in the art to which the subject invention appertains will readily understand how to make and use the blade tip clearance sensor, sensing system and sensing method of the subject invention without undue experimentation, preferred embodiments thereof will be described in detail below with reference to certain figures, wherein:

FIG. 3 is an exploded perspective view of the electromagnetic sensor assembly of shown in FIG. 2, with parts separated for ease of illustration;

FIG. 4 is an exploded perspective view of the ceramic well and sensor body of the electromagnetic sensor assembly of FIGS. 2 and 3, showing the wound coil in a recess formed at the distal end portion of the ceramic body;

FIG. 5 is cross-sectional view, taken along line 5-5 of FIG. 1, illustrating the electromagnetic sensor assembly during engine operation, wherein a RF electromagnetic field is generated to measure or otherwise monitor the clearance between engine casing and the blade tips;

FIG. 5a is a localized view of the distal end portion of the sensor assembly, illustrating the multi-layered wrapping of the coil turns;

FIGS. 6 and 7 are cross-sectional views of the proximal end portion of the sensor assembly of the subject invention, illustrating the steps of filling the sensor cavity with a ceramic powder or felt and then introducing an inert gas into the cavity to protect the cable lead wires from oxidation;

FIG. 8 is a perspective view of the electromagnetic sensor assembly of the subject invention, which employs coaxial conductors that include two different materials to form the center conductors, as shown illustrated FIG. 9;

FIG. 10 is and exploded perspective view of another embodiment of the electromagnetic sensor assembly of the subject invention, which includes two sensor bodies; and FIG. 11 is a cross-sectional view of the electromagnetic sensor assembly of FIG. 10, illustrating the axially off-set sensor bodies located within the sensor assembly.

DESCRIPTION OF THE PREFERRED EMBODIMENTS

Figure 1:
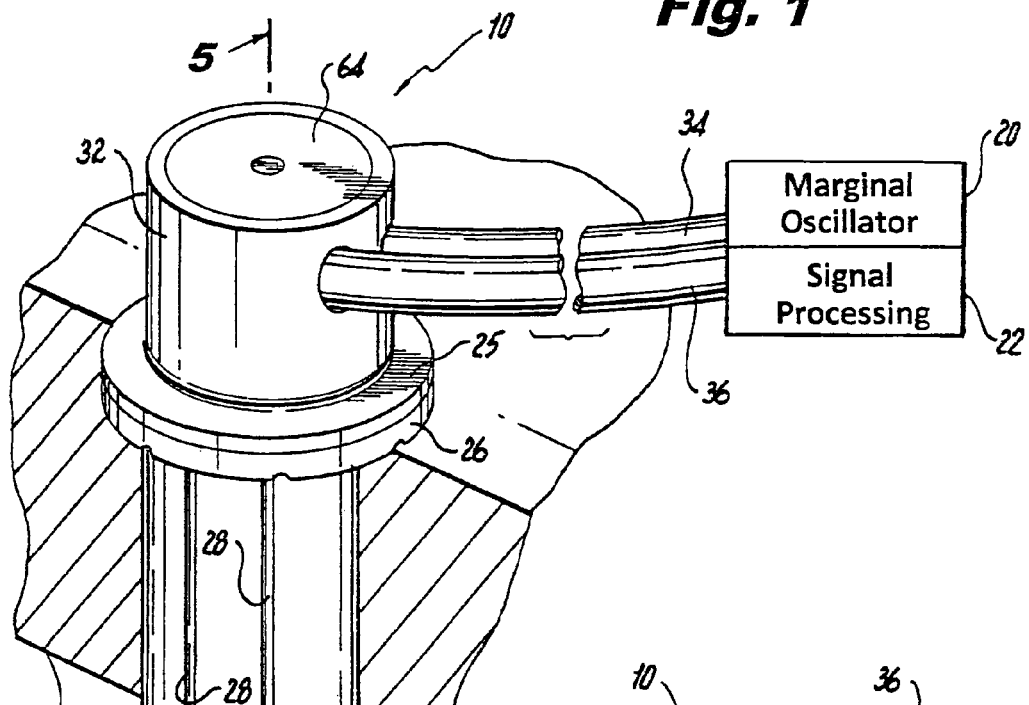
FIG. 1 is a perspective view of an electromagnetic sensor assembly for measuring blade tip clearance in a gas turbine engine, constructed in accordance with a preferred embodiment of the subject invention, wherein the sensor assembly is mounted in the engine casing of a gas turbine engine adjacent the outer periphery of a rotor disc carrying an array of turbine blades, and is operatively associated with a marginal oscillator circuit for generating a RF electromagnetic field and a signal processing circuit for processing output signals from the sensor assembly in response to perturbation of the field by the blade tips during engine operation.

Referring now to FIG. 1, there is illustrated a blade tip clearance measurement sensor assembly constructed in accordance with a preferred embodiment of the subject invention and designated generally by reference numeral 10. As illustrated, sensor assembly 10 is mounted in the casing 12 of a gas turbine engine adjacent to a blade tip 14 of a turbine blade 16. While not shown, those having ordinary skill in the art will readily appreciate that an array of turbine blades 16 are mounted on a rotating disc within the engine casing 12.

Sensor assembly 10 employs a RF electromagnetic field to measure or otherwise monitor the clearance that exists between the blade tips 14 and the engine casing 12, with a high degree of accuracy. As explained in more detail below, sensor assembly 10 is constructed in such a manner so as to withstand the severe environmental and operational conditions that exist in and adjacent to the turbine gas path, where operating temperatures often reach as high as 1400° C.

As shown schematically in FIG. 1, the sensor assembly 10 is operatively associated with a marginal oscillator circuit 20. The marginal oscillator circuit 20 is designed to generate a RF electromagnetic field for measuring blade tip clearance, in near real time. An example of such a circuit is disclosed in U.S. Pat. No. 6,984,994, the disclosure of which is incorporated herein by reference in its entirety.

During engine operation, perturbation of the RF electromagnetic field by the blade tips 14 moving therethrough represents a change in susceptibility that impacts the marginal oscillator circuit 20, providing a signal indicative of the position of the blade tips 14 relative to the engine casing 12. In this regard, the storage of energy by the field gives rise to a change in frequency (FM), while a loss of energy from the field gives rise to a change in its amplitude (AM). Both of these signatures are part of the output signal data stream. In other words, the sensor assembly 10 supports two simultaneous data streams relating to blade tip clearance, including one data stream that is related to oscillator frequency and one data stream that is related to oscillator amplitude.

A signal processing circuit 22 conditions the output signal from the sensor assembly 10 and oscillator 20 to provide an output measurement of the blade tip clearance that is readily interpreted by those having ordinary skill in the art. Moreover, the output signal from the sensor assembly 10 and oscillator 20 is conditioned by the signal processor 22 in such a manner so as to provide an indication of the gap distance that exists between the rotating blade tips 14 and the engine casing 12, as shown for example in FIG. 5.

Figure 2:
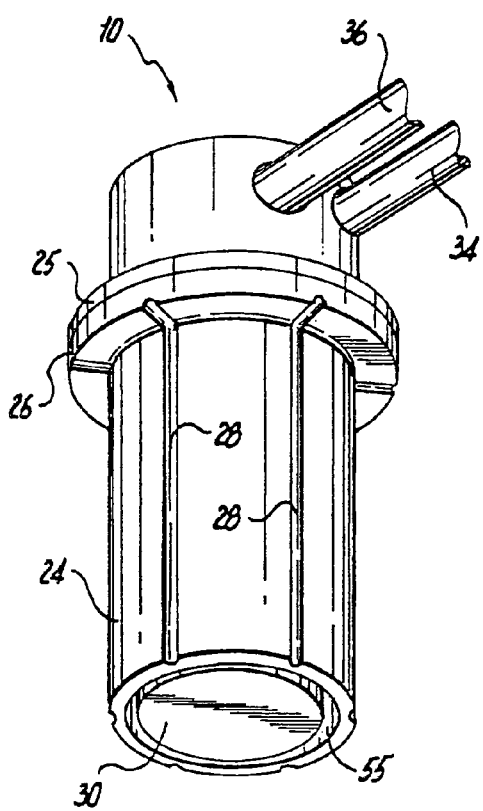
FIG. 2 is a perspective view of the electromagnetic sensor assembly of the subject invention.

Referring now to FIG. 2, the sensor assembly 10 of the subject invention includes a cylindrical outer housing 24 that is adapted and configured to mount to the casing 12 of a gas turbine engine, as shown in FIGS. 1 and 5. The outer housing 24 is formed form a heat resistant metal that is preferably compatible with the material from which the surrounding engine casing is constructed, such as, for example, Ni—Cr alloy 600 or a similar material. The outer housing 24 of sensor assembly 10 has an open distal end, as shown in FIG. 2, and a proximal mounting flange 26 dimensioned to be positioned against the exterior surface of the engine casing 12.

As best seen in FIG. 5, the open distal end of the outer housing 24 is slightly recessed from the interior surface of the engine casing 12, to protect the sensor assembly 10 from damage during engine operation. Because of this special accommodation, the tip clearance sensing system must be calibrated by correcting the output signal from the sensor assembly to account for the additional distance between the engine casing 12 and the electromagnetic field sensing element.

A plurality of circumferentially spaced apart, longitudinally extending cooling channels 28 are formed in the exterior surface of outer housing 24. The cooling channels 28 direct cool air toward the distal sensor head located within the engine casing as a result of the pressure differential that exists between the exterior of the engine casing where the flange 26 is located and the interior of the engine casing where the distal sensing head of the sensor assembly is located. Those skilled in the art will readily appreciate that these cooling channels would only be effective in engine applications where the hot side of the engine casing is at a lower pressure than the cool side of the engine casing. In engine applications where this pressure differential is not present, the cooling channels in the outer housing can be eliminated.

With continuing reference to FIG. 2, the sensor assembly 10 further includes a cylindrical ceramic well 30, which contains or otherwise encloses the internal sensor components, as described in more detail below with respect to FIGS. 3 and 4. Sensor assembly 10 also includes a metal cable adapter 32 having a flange 25 that is welded to the mounting flange 26 at proximal end of the outer housing 24. Cable adapter 32 facilitates the connection of a pair of metal-sheathed coaxial cables 34 and 36 with the sensor assembly 10. The metal sheathed coaxial cables 34 and 36 are attached to the metal cable adapter 32 by brazing or a similar mechanical joining technique.

Coaxial cables 34 and 36 operatively connect the sensor assembly 10 to the marginal oscillator circuit 20 and the signal processing circuit 22, respectively. The coaxial cables 34 and 36 are low-loss ceramic insulated, metal sheathed, RF cables (e.g., silicon oxide insulated RF cables or the like) that are adapted to minimize high frequency losses. In accordance with the subject invention, signals are transmitted to and from sensor assembly 10 by way of the center conductors of coaxial cables 34 and 36. The outer conductors provide dielectric shielding for the center conductors and form part of the hermetically sealed closure which defines the sensor assembly 10.

Referring now to FIGS. 3 and 4, the ceramic well 30 of sensor assembly 10 is formed from aluminum oxide and is secured to the outer housing 24 by a metallic transition ring 38. More particularly, a metallized coating indicated by reference numeral 35, is applied to the proximal end portion of the ceramic well 30. An example of a suitable metallized coating consists of a molybdenum manganese film with nickel plating. An annular section of the inner periphery of the transition ring 38 is brazed or otherwise mechanically joined to the metallized surface 35 of the ceramic well 30, while an annular section of the outer periphery of the transition ring 38 is brazed or otherwise mechanically joined to an inner annular section 27 of the outer metallic housing 24, below mounting flange 26, as best seen in FIG. 5. The transition ring 38 is preferably formed from Pt-10Rh and serves to buffer thermal stress between the ceramic well 30 and the outer metal housing 24.

As best seen in FIG. 4, sensor assembly 10 further includes a cylindrical sensor body 40 or former supported within the ceramic well 30. Sensor body 40 is formed from a ceramic material, such as for example, aluminum oxide or a similar refractory material. An annular recess 42 is formed in the distal end portion of the sensor body for accommodating a wound wire coil 44. Wire coil 44 serves as the functional sensing element of sensor assembly 10 by producing the RF electromagnetic field generated by the marginal oscillator circuit 20 to measure the clearance between the engine casing 12 and blade tips 14, as shown for example in FIG. 5. In essence, the wire coil 44 is a remote extension of the marginal oscillator circuit 20 located adjacent to the target or object that is to be sensed, namely, the blade tips 14.

As explained above, the distal end portion of the sensor assembly 10, and hence the coil wire 44, is recessed into the engine casing wall to protect the sensor assembly 10 during engine operation. Since the distance between the coil 44 and engine casing 12 is a fixed distance, the output signal from the coil 44 can be corrected as part of the system calibration to provide the requisite clearance distance between the engine casing 12 and the blade tips 14.

The coil 44 is formed from a heat resistant wire comprised of a platinum group metal or alloy thereof, such as, for example, Pt-10Rh, which is a platinum alloy that includes 10% Rhodium. The wire of coil 44 is of relatively small gauge, such as, for example 0.003 inches, and is preferably coated with ceramic, for example, aluminum oxide to provide electrical insulation for the densely packed, multi-layered construction of wire coil 44.

More particularly, as best seen in FIG. 5a, to fit as much wire as possible into the distal annular recess 42 of sensor body 40, the coil 44 is formed in plural winding layers, with each winding layer having multiple turns. In an exemplary embodiment of the sensor assembly 10, the radially inner wound layer has 8 turns, the middle wound layer has 7 turns and the radially outer wound layer has six turns. The coil 44 is coated with cement (e.g. aluminum oxide and colloidal silica) to anchor the wires to the sensor body 40.

The sensor body 40 also includes diametrically opposed lateral channels 46 and 48 for respectively accommodating the lead wires 34a and 36a that extend from the two coaxial cable 34 and 36. Preferably, the lead wires 34a and 36a are fused to the center conductors of the coaxial cable 34 and 36. The lead wires 34a and 36a are also connected to the opposite ends of wire coil 44, within in diametrically opposed molded recesses 50, one of which is shown for example in FIG. 4.

In this regard, the lead wires 34a and 36a are fed from the respective lateral channels 46 and 48, though internal passages formed within the ceramic sensor body 40, and out to the opposed molded recesses 50 where they join the opposed ends of wire coil 44. The lead wires 34a and 36a are attached to the opposed ends of the wire coil 44 by a mechanical crimp or fuse joint or by similar mechanical means. Preferably, the lead wires 34a and 36a are formed from Pt-10Rh.

Alternatively, the lead wires 34a and 36a and the wire coil 44 can be made from an oxide dispersion strengthened platinum group metal or alloy thereof to enhance the high temperature reliability of the sensor assembly 10. This material is produced with fine ceramic particles, such as zirconia or yttria, dispersed throughout the metal, that serve to stabilize the grain structure when used at high temperatures. In the field of thermometry, it is known to improve the durability of sensor components in this manner. An example of heat resistant wires for use in temperature sensing is disclosed in U.S. Pat. No. 7,026,908, the disclosure of which is incorporated herein by reference in its entirety.

As best seen in FIGS. 3 and 5, the proximal end portions of lead wires 34a and 36a of cable adapter 32, which are located within the interior cavity 45, are bent at a right angle. This structural geometry provides a means of thermal strain relief in the lead wires to ensure that a reliable mechanical connection is maintained between the lead wires and the opposed ends of coil wire 44.

Referring to FIG. 5, the ceramic sensor body 40 is mounted in or otherwise molded into place within the ceramic well 30 of sensor assembly 10 by a ceramic-based potting material 60. The potting material 60 ensures that the sensor body 40 is securely positioned within the well 30 so that the location of the coil 44 is rigidly maintained. It is envisioned and within the scope of the subject disclosure that the ceramic well and ceramic sensor body of sensor assembly 10 could be formed as a unitary ceramic component, rather than two separate elements that are joined together to form an integral structure. Those skilled in the art will readily appreciate that the use of a platinum group metal or alloy thereof for forming the lead wires and wire coil is particularly advantageous during fabrication of the sensor assembly, since that material can withstand the sintering temperatures that are required to fabricate a unitary ceramic component.

With continuing reference to FIG. 5, the inner diameter of the metal outer housing 24 has an increased inner diameter, forming an annular recess 55 that surrounds the distal portion of the ceramic well 30, in the region of coil 44. This is done to minimize the influence of the metal housing 24 on the electromagnetic field produced by the coil.

As shown in FIG. 5, a cover 64 is provided at the proximal end of cable adapter 32 to enclose and seal the interior cavity 45 thereof. However, before welding the cover 64 to the cable adapter 32, the interior cavity 45 of the cable adapter 32 is filled with a ceramic powder or felt, as shown for example in FIG. 6. Thereafter, the cover 64 is welded onto the adapter 32. Then, an inert gas is introduced into the cavity 35 through a port 66 in the cover 64. The port 66 is then closed with a welded plug 68. The ceramic powder or felt provide mechanical support for the cable lead wires 34a and 36a, while the inert gas serves to protect the cable lead wires 34a and 36a from oxidation.

In an alternative embodiment of the subject invention, as shown for example in FIGS. 8 and 9, a more robust cable configuration can be employed. That is, the center conductor of each coaxial cable 34, 36 would be formed from two different conductors 72, 74, consisting of two different materials, materials joined together in series at a junction point 75. The two conductor materials forming the center conductor of the coaxial cables would include a first temperature resistant conductor material, such as Pt-10Rh or a similar platinum based alloy, located in a region "a" of relatively high adjacent (e.g., 900° C.) to the sensor assembly 10 and a second conductor material, such as copper, located in a region "b" of relatively lower temperature (e.g., 250° C.) remote from the sensor assembly 10. This serial conductor configuration would eliminate the need for backfilling the interior cavity 45 of cable adapter cavity 32 with a protective inert gas.

Referring to FIG. 5, during engine operation, to monitor the clearance "x" that exists between the engine casing 12 and blade tips 14, in an effort to maintain a minimum clearance, the coil 44 at the distal end of sensor body 40 produces a RF electromagnetic field, which is generated by the marginal oscillator circuit 20. The sensor assembly 10 detects changes in the electromagnetic field as the rotating blade tips 14 pass therethrough. The signal processing circuit 22 then determines the position of the blade tips 14 relative to the engine casing 12 based upon changes in the electromagnetic field produced by the coil 44. Using that information, adjustments can be made to the rotor disc and/or engine casing, to minimize the clearance between the blade tips and engine casing, and thus improve engine efficiency.

Referring to FIGS. 10 and 11, there is illustrated another embodiment of the electromagnetic sensor assembly of the subject invention which is designated generally by reference numeral 100. Sensor assembly 100 includes two sensor bodies 140a and 140b mounted side-by-side within a single ceramic well 130 having parallel well chambers 130a, 103b. The ceramic well 130 is enclosed within a metal outer housing 124, with each sensor body 140a, 140b having a separate wire coil 144a, 144b for producing an independent electromagnetic field. That is, each coil is driven by or otherwise a remote part of a separate marginal oscillator circuit.

As best seen in FIG. 11, the distal end portions of the sensor bodies 140a, 140b and thus the coils 144a and 144b associated therewith are axially off-set from one another. For example, one coil may be axially displaced from the other coil by about 0.5 mm. As a result, each coil will produce a different voltage and frequency response as the blade tip passes through the electromagnetic field. This dual coil arrangement will facilitate system level self-calibration of the sensor system.

While the heat resistant electromagnetic sensor assembly and sensing system of the subject invention has been shown and described with reference to preferred embodiments, those skilled in the art will readily appreciate that various changes and/or modifications may be made thereto without departing from the spirit and/or scope of the subject disclosure.

What is claimed is:

1. An electromagnetic field sensor assembly comprising:
a) a ceramic sensor body;
b) a wire coil wound about a distal end portion of the ceramic sensor body for producing an electromagnetic field, wherein the wire coil is formed from a platinum group metal or an alloy thereof;
c) a ceramic well having an interior cavity with a closed distal end for sealingly enclosing the ceramic sensor body and the wire coil; and
d) a metallic housing surrounding a periphery of the ceramic well and having an open distal end, wherein the metallic housing includes an increased inner diameter at the open distal end forming an annular recess between the distal end of the metallic housing and a distal portion of the ceramic well, the annular recess and open distal end being dimensioned to reduce the influence of the metallic housing on the electromagnetic field.

2. An electromagnetic field sensor assembly as recited in claim 1, wherein the sensor body is formed from aluminum oxide.

3. An electromagnetic field sensor assembly as recited in claim 1, wherein the sensor body is rigidly mounted within the ceramic well.

4. An electromagnetic field sensor assembly as recited in claim 1, wherein the wire coil is formed from an oxide dispersion strengthened platinum group metal or alloy thereof.

5. An electromagnetic field sensor assembly as recited in claim 1, wherein the wire coil is formed from a ceramic coated wire.

6. An electromagnetic field sensor assembly as recited in claim 1, wherein the wire coil is formed by plural layers, each layer having a plurality of turns.

7. An electromagnetic field sensor assembly as recited in claim 1, wherein the distal end portion of the sensor body has an annular recess for accommodating the wire coil.

8. An electromagnetic field sensor assembly as recited in claim 7, wherein the wire coil is anchored to the sensor body within the annular recess by cement.

9. An electromagnetic field sensor assembly as recited in claim 1, wherein the ceramic well is formed from aluminum oxide.

10. An electromagnetic field sensor assembly as recited in claim 1, wherein the ceramic well is a sealed enclosure.

11. An electromagnetic field sensor assembly as recited in claim 1, wherein the metallic housing is formed with cooling channels.

12. An electromagnetic field sensor assembly as recited in claim 1, further comprising a metal transition member joining the ceramic well to the metallic housing.

13. An electromagnetic field sensor assembly as recited in claim 1, further comprising a cable adapter joined to a proximal end portion of the metallic housing.

14. An electromagnetic field sensor assembly comprising:
a) a ceramic sensor body;
b) a wire coil wound about a distal end portion of the ceramic sensor body for producing an electromagnetic field, wherein the wire coil is formed from a platinum group metal or an alloy thereof;
c) a ceramic well having an interior cavity with a closed distal end for sealingly enclosing the ceramic sensor body and the wire coil; and
d) a metallic housing surrounding a periphery of the ceramic well and having an open distal end, wherein the metallic housing is formed with cooling channels longitudinally extending from a proximal end portion of the metallic housing to the open distal end of the metallic housing, wherein each of the cooling channels is axially spaced apart and positioned to direct cool air distally to regulate a pressure differential between the proximal end portion and the distal end.

* * * * *